(12) United States Patent
Teloh et al.

(10) Patent No.: US 6,917,929 B2
(45) Date of Patent: Jul. 12, 2005

(54) CONFIGURATION FOR A STORAGE NETWORK

(75) Inventors: John Teloh, Fort Lauderdale, FL (US); Simon Crosland, Woking (GB)

(73) Assignee: Sun Microsystems, Inc., Santa Clara, CA (US)

(*) Notice: Subject to any disclaimer, the term of this patent is extended or adjusted under 35 U.S.C. 154(b) by 367 days.

(21) Appl. No.: 09/906,894

(22) Filed: Jul. 16, 2001

(65) Prior Publication Data

US 2003/0028521 A1 Feb. 6, 2003

(51) Int. Cl.[7] .................................................. G06F 17/30
(52) U.S. Cl. .......................................... 707/1; 707/100
(58) Field of Search .............................. 707/200, 101, 707/1–5

(56) References Cited

U.S. PATENT DOCUMENTS

| | | | | |
|---|---|---|---|---|
| 5,247,683 A | * | 9/1993 | Holmes et al. | 709/221 |
| 5,740,431 A | * | 4/1998 | Rail | 707/200 |
| 5,771,381 A | * | 6/1998 | Jones et al. | 713/100 |
| 5,999,180 A | * | 12/1999 | Coskrey, IV | 345/810 |
| 6,128,730 A | * | 10/2000 | Levine | 713/1 |
| 6,151,605 A | * | 11/2000 | Costa | 707/101 |
| 6,496,843 B1 | * | 12/2002 | Getchius et al. | 715/526 |
| 6,560,699 B1 | * | 5/2003 | Konkle | 713/1 |
| 6,598,057 B1 | * | 7/2003 | Synnestvedt et al. | 707/200 |
| 2002/0052937 A1 | * | 5/2002 | Jager | 709/220 |

* cited by examiner

Primary Examiner—Alford Kindred
Assistant Examiner—CamLinh Nguyen
(74) Attorney, Agent, or Firm—Lahive & Cockfield, LLP

(57) ABSTRACT

A storage system which supports distributed management of client configurations by storing such configuration information for a number of products across the storage network in a central repository is provided. The system further includes an external parser configuration file to provide a framework allowing users to access configuration data. The parser is separate from the configuration information repository. The parser is key-driven and extensible, facilitating programming, updates and modifications without modifying the binary library containing the configuration information.

20 Claims, 3 Drawing Sheets

CONFIGURATION FOR A STORAGE NETWORK

FIELD OF THE INVENTION

The present invention relates to data storage. More particularly, the present invention relates to controlling configuration information for components of a storage network.

BACKGROUND OF THE INVENTION

A storage network is a network that connects a set of host computers with one or more storage devices. Host computers typically store configuration information regarding the capabilities and requirements of components in the storage network. Configuration information may describe the physical devices connected to the network and can include, for example, the amount of memory on the storage devices, data bus types, installed system software services, specific user and group application profiles, and hardware specifications.

A drawback of current data storage products is the use of an excessive number of configuration files. Since the host computers are relatively self-sufficient and store their own configuration information, the task of data and application management on a host computer has become increasingly burdensome. Current data storage products have numerous text-based files, which needed to be individually edited in order to achieve a working configuration. Although it is possible to propagate minor changes or fixes to applications that reside on a server on the network to the host computers, any significant upgrade, fix or installation of a new application that affects every host in the network requires that each host computer be accessed and updated individually by a network administrator. With the increasing number of host computers being connected to storage networks, installing major revisions or upgrades to application software or to general configuration software is expensive, inefficient, and time-consuming.

SUMMARY OF THE INVENTION

An illustrative embodiment of the present invention employs an external parser configuration file that is used by a parser that parses configuration information stored in a central repository. The parser and parser configuration file, which defines rules for parsing data, are separate from the central configuration repository. The parser configuration is key-driven and extensible. The parser facilitates programming and modifications to the configuration without the need for modifying the underlying code that is responsible for managing the configuration information. The illustrative arrangement allows changes and updates to the network storage system to be implemented quickly, without the necessity of rebuilding and recompiling application programs that use configuration information from the repository.

The illustrative embodiment of the present invention consolidates configuration information into a location that can be shared and managed across a cluster. As used herein, a "cluster" refers to two or more computer systems that are linked together in order to handle variable workloads or to provide continued operation in the event one fails. The illustrative embodiment provides a storage system which supports distributed configuration management by storing configuration information for a number of components across the storage network in a central repository. The centralization of configuration information allows a network administrator to manage subsystem configurations from the server, and to propagate all types of changes to applications from the server.

DETAILED DESCRIPTION

The present invention will be described with reference to the Figures. While the invention will be described in conjunction with an illustrative embodiment in a storage network, it will be understood that the invention is not limited to the illustrated embodiment. To the contrary, it is intended to cover alternatives, modifications, and equivalents as may be included within the spirit and scope of the invention as defined by the appended claims.

Figure 1:
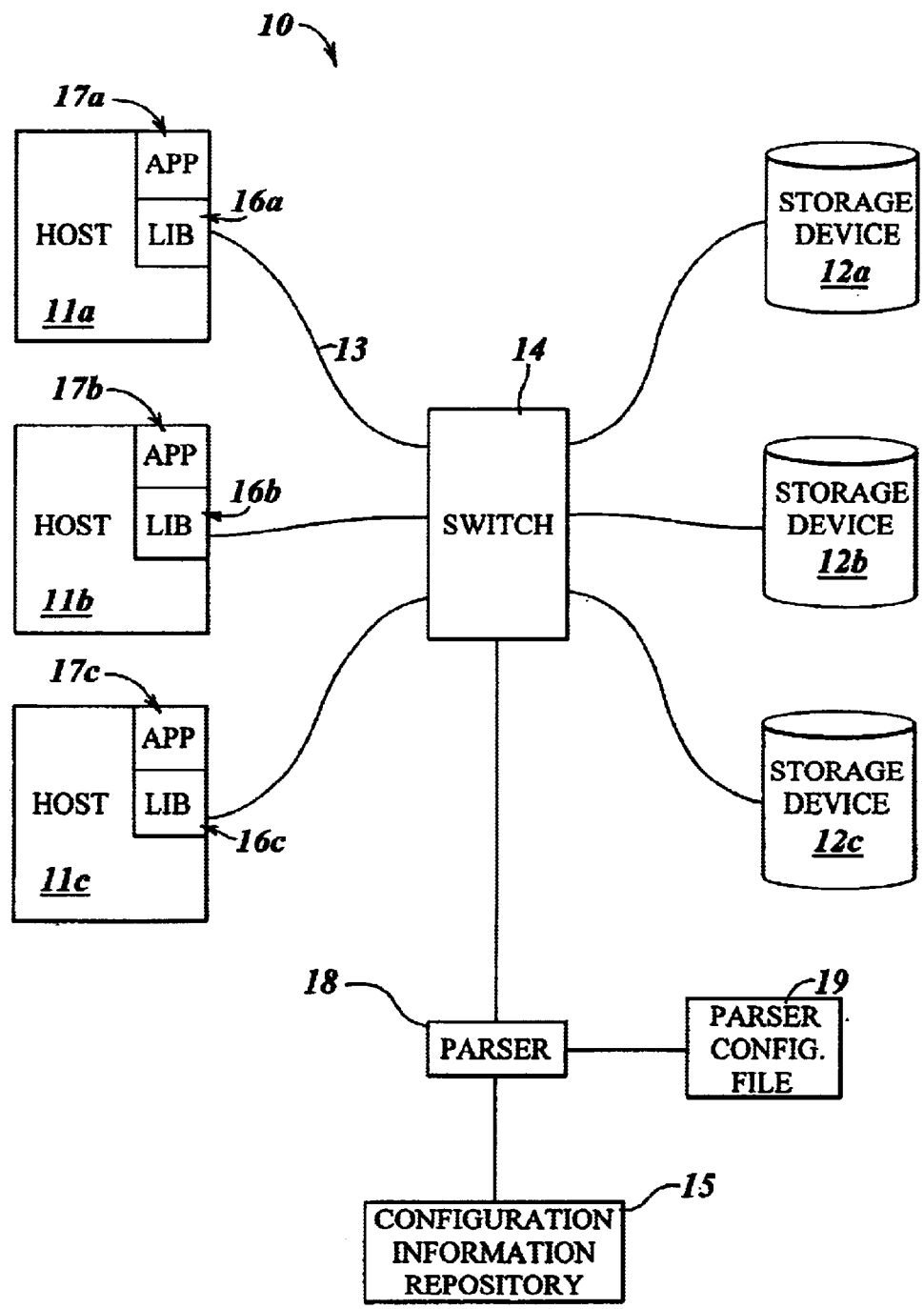
FIG. 1 illustrates a storage network suitable for implementing an illustrative embodiment of the present invention.

FIG. 1 illustrates a storage network according to the illustrative embodiment of the invention. The storage network 10 includes a plurality of hosts 11a, 11b, 11c connected to a plurality of storage devices 12a, 12b, 12c via communications links 13, such as optical fibers or wiring. The hosts 11a, 11b, 11c, may be, for example, workstations, personal computers, server computers, or other intelligent electronic devices. Each host includes a set of applications 17a, 17b, 17c for processing data, such as spreadsheets, word processors, communications programs, management services applications, database programs, etc, and a library 16a, 16b, 16c containing a set of software routines which are linked into the applications when the applications are compiled. A switch 14 directs the flow of data between different respective components of the storage network 10. The hosts 11a, 11b, 11c communicate with the storage devices 12a, 12b, 12c using protocols, such as those in the TCP/IP protocol suite.

According to the illustrative embodiment, configuration information for the data storage system is centralized in a central location in the storage network and is accessible by multiple hosts. A configuration repository 15 contains the configuration information regarding the components of the network 10. The central configuration repository 15 allows a network administrator to update, modify and manage configuration information for each of the computers in the storage network from a single server. According to the illustrative embodiment, the configuration repository 15 may be either a shared file on a distributed file system or a shared disk partition. The configuration information is accessible by multiple hosts within the network. Those skilled in the art will appreciate that other alternative arrangements may be used in practicing the present invention.

According to the illustrative embodiment, the configuration information stored in the configuration repository 15 is divided into two major sections: a shared configuration section and a persistent data section. The data stored in the configuration section is assumed to be ASCII string data in the illustrative embodiment. Those skilled in the art will appreciate that in alternative embodiments, the configuration information may be stored in alternative formats, such as in a word processing document, a custom format, hexadecimal, etc. The shared configuration section contains configuration information that is accessed and utilized used by command line interfaces (CLI's) of the hosts and the management service applications. The CLI's provide the facilities to allow an administrator to initiate, dump and rebuild existing applications. The library configuration CLI utilities can add and delete entries to the configuration, allowing the installation programs on the hosts to create and upgrade the shared configuration section when needed.

The second configuration section contains persistent data. "Persistent data", as opposed to transient data, refers to data that is persistently stored. An example of persistent data is configuration information related to user environments that is stored on persistent storage. When a user logs on, his or her last saved environment needs to be retrieved so he or she does not have to reset the environment. A library configuration user level application programming interface (API) is utilized for retrieving and saving persistent configuration information for the data storage product software.

With respect to FIG. 1, a parser 18 is connected to the configuration repository and performs parsing operations on the configuration information stored in the configuration repository 15 under the control of an extensible parser configuration file 19. The parsed configuration information is then transmitted to the applications, which utilize the configuration information to perform data processing. According to the illustrative embodiment, the parser 18 is key-driven to facilitate the parsing of configuration information. The parser rule configuration file 19 defines the parser rule architecture for controlling and processing the configuration information. The parsing grammar includes an extensible parser configuration and an actual key for entering or retrieving data. The parser configuration exists on disk and in core once the parser configuration file is opened and may be updated to extend the key that is used to retrieve or place data from or into the appropriate configuration section (shared configuration or persistent). One skilled in the art will recognize that the parser configuration is not limited to a file, but can comprise any suitable collection of data for defining the parser rules.

Figure 2:
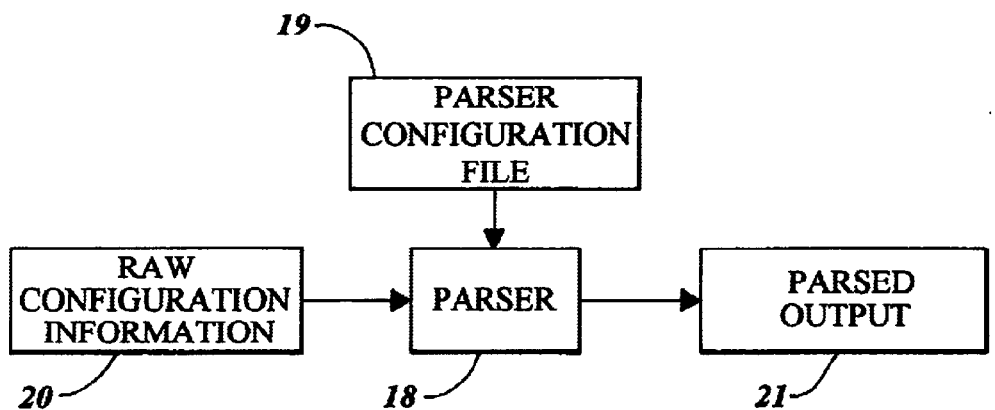
FIG. 2 is a block diagram illustrating the parsing of configuration information by a parser under the control of an external parser configuration file.

FIG. 2 is a block diagram illustrating the parsing of raw configuration information by the parser 18. The extensible parser configuration file 19 controls the parser 18. The parser performs parsing operations on raw configuration information 20 according to the parser rules defined in the parser configuration file 19. The parser output 21 is utilized by the applications on the hosts.

The parser configuration file, according to the illustrative embodiment, defines the order of data and supplies routines to retrieve, read, write and query data in the configuration sections. In other words, the parser configuration file defines a set of rules for how data is parsed out. A sample parser configuration file defining rules for parsing information for the configuration section according to the illustrative embodiment is as follows:

scm.thread.size
ii.master.shadow.bitmap.mode.over-flow.group.cnode.options
sndr.phost.primary.pbitmap.shost. secondary.sbitmap.mode.type.group.cnode.options
sndr_ii.secondary.shadow.bitmap.cnode
bitmaps.bitmap.cnode
sv.vol.mode.cnode
ste_tm.port.driver.device.id.cnode
ste_vd.num.path.port.lun.state.cnode.options
ste_ph.device.path.start.size.cnode The syntax of the separate, extensible parser configuration file of the illustrative embodiment is as follows:
service_tag.name1.name2.name3 . . .

Each entry in the two configuration information sections is prefaced with a tag, which is used for retrieval. Each section further contains a comment indicating the nature of the fields displayed. For example, the 'service_tag' is used for general retrieval and organization of data entries. The name fields are positionally ordered and are used to retrieve or input the particular field of interest. If a value is not present for a given field, a place holder is inserted. According to the illustrative embodiment, empty or null entries in the configuration are specified with a '-' as a place holder, and a dot '.' is used for separation of fields (i.e. as a delimiter) in the parser configuration. The rules can be programmatically used and persist across the configuration. According to the illustrative embodiment, the values are formatted as ASCII strings.

The parser configuration rules in the parser configuration file define the positional order of fields and how they may be retrieved from and/or written into the specified configuration information section (shared configuration or persistent). For example, the parser rule:

ii.master.shadow.bitmap defines a service tag "ii" followed by three fields "master", "shadow" and "bitmap" for the shared configuration section. A special tag specification defines for a given key which set of data to access. To access the first set of data as specified in the above parser configuration, a user of the data storage system uses a key of:

ii.set1

This key returns all of the specified strings as defined in the parser configuration. If the user only needs the master volume, then the following key can be used:

ii.set1.master

To access the next master volume entry, the following key is used:

ii.set2 .master

The parser configuration for the persistent data section utilizes the same service tags as the configuration section, such that the defined syntax for the key can reference a given set of data in the configuration repository.

Figure 3:
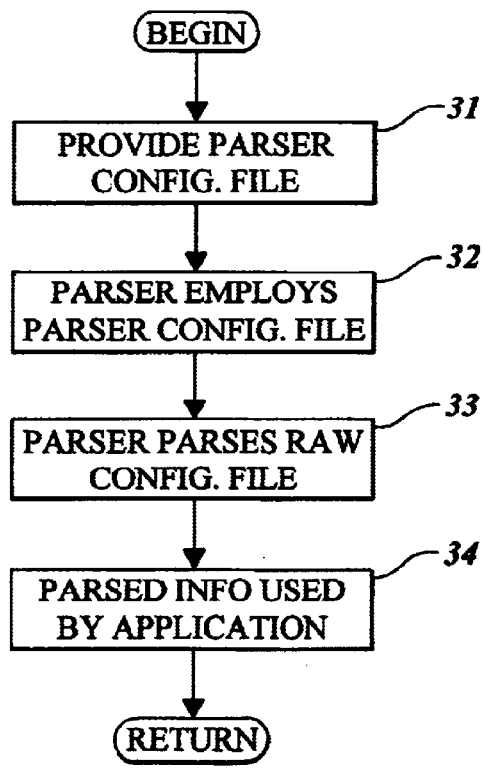
FIG. 3 is a flow chart diagramming the steps involved in parsing configuration information from a central configuration repository.

FIG. 3 is a flow chart diagramming the steps involved in parsing the configuration information for use by applications on hosts of the data storage network. In step 31, the parser configuration file 19, as described above, is provided. According to the illustrative embodiment, the parser configuration file 19 is generated and compiled during the initial creation of the configuration repository for the storage network as an ASCII file. In step 32, the parser 18 employs the parser configuration file. According to the illustrative embodiment, the parser configuration file becomes a part of the actual parser configuration. In step 33, the parser 18 parses the raw configuration information from the configuration repository 15 according to the rules defined by the parser configuration file 19. In step 34, the parsed configuration information is used to run the applications on the hosts 11a, 11b, 11c.

Figure 4:
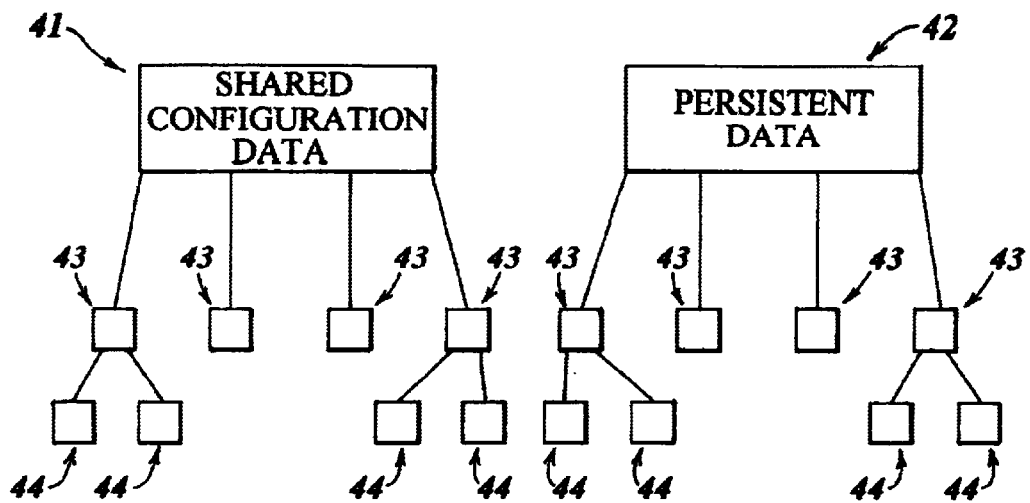
FIG. 4 is a block diagram showing a tree structure of the parser configuration data built by the parser.

The entries in the configuration repository 15 may be built into a tree hierarchy, as illustrated in FIG. 4 and defined by the parser configuration file 19. The illustrated tree contains the tag and the fields and the positional orders of the tag and field for the parser configuration. As discussed above, the configuration information is divided into either a shared configuration section 41 or a persistent data section 42. Tags 43 in the parser configuration file 19 define the various components of the data storage network and the particular attributes of these components. Fields 44 are organized in hierarchical order under the tags 43 and contain values describing the particular attributes or descriptions of the components in the data storage network.

For example, in the parser configuration file of the illustrative embodiment, the tag "scm" is utilized for the features of a storage cache in the storage devices. The tag "sv" is used for the configuration of a storage volume driver. The field "cnode" defines in which cluster disk service group or resource the entry will participate in the configuration and the field "mode" defines an access mode for a particular device for which the storage volume driver is to be enabled. The "sndr" tag defines volume sets and their host location. The fields defined after the sndr tag include "phost", which defines the server on which the primary volume resides, "pbitmap", which defines the volume partition or file in which the bitmap of the primary partition is stored, "shost", which defines the server on which the secondary volume resides, "sbitmap", which defines the volume partition or file in which the bitmap of the secondary file is stored and "mode", which defines the sndr operating mode. The "bitmaps" tag is directed to a file system used to contain file-based bitmaps. The tag "ii" contains the volume names of a master, shadow and bitmap volume enabled in a software program for creating and storing a point-in-time copy of data. The "ste_tm" tag is utilized to define the port configuration for the nodes in the storage network. The tag "ste_vd" is used to define parameters for configuring a virtual disk storage device. The tag "ste_ph" is used to configure a phantom device on the storage network.

According to the illustrative embodiment, the parser configuration is extensible and can be easily modified and updated through a set of file handling routines defined by an API, without having to modify the binary library containing precompiled routines for programs that run on the hosts of the data storage network. Once the parser configuration is installed, it is not necessary to change the parser configuration unless adding a new field to the configuration.

Figure 5:
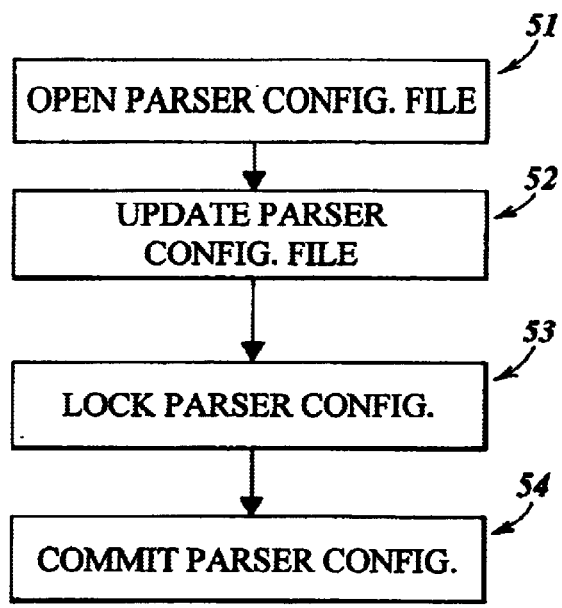
FIG. 5 is a flow chart diagramming the steps involved in modifying the parser configuration file.

FIG. 5 is a flow chart diagramming the file handling routines involved in updating or modifying the extensible parser rules in the parser configuration file according to the illustrative embodiment of the invention. In step 51, a user opens the parser configuration file. In step 52 the user modifies the parser configuration file. For example, in the illustrative embodiment, an update command, such as "int cfg_update_parser_config(CFGFILE*, const char *key, int section)" is utilized to add a new key to the parser configuration. Parser keys are cumulative and appended to the end of the parser configuration. The "update" command specifies a new parser configuration key to add, as well as the section to which the new key corresponds. In step 53, the user enters a "lock" command to lock the configuration. According to the illustrative embodiment, the locking is implemented as a read-write lock, where many read locks can be held concurrently, but a write lock is exclusive. The user enters a "commit" command in step 54 to write the modified version of the configuration and persistent data to the parser configuration file. Because multiple hosts may access the parser configuration, care must be taken to properly open and lock the parser configuration when updating the parser configuration. The two stage locking and committing of the configuration ensures that a usable parser configuration file is available at all times.

Additional routines are utilized for extracting or modifying data according to the extensible parser rules set forth in the parser configuration file. For example, the command "int cfg_get_cstring(CFGFILE *fd, const char *key, void *value, int val_len)" returns information from the shared configuration section in the value as specified by the key in the configuration section. The command "int cfg_put_cstring(CFGFILE *fd, const char *key, void *value, int val_len)" is utilized to put or replace a specified key, as specified in the "cfg_get_cstring( )" command, with a new value in the configuration section. The command "int cfg_get_pstring(CFGFILE *fd, const char *key, void *value, int val_len)" returns information from the persistent section in the value as specified by the key. Finally, the command "int cfg_put_pstring(CFGFILE *fd, const char *key, void *value, int val_len)" puts or replaces a specified key, as specified in cfg_get_pstring( ), with new value in the persistent section.

The implementation and use of a central configuration repository allows a network administrator to manage configuration information for each of the computers in the storage network from a single server. Thus, any software updates, version upgrades, or installation of new applications that require knowledge of and access to configuration information for any of the components of the network can be implemented from the central repository and propagated to the individual hosts. Users of the hosts 11a, 11b and 11c do not have to exit applications and, moreover, the storage network does not have to be brought down for maintenance in order to install or propagate the new upgrade or version of the application.

The use of a separate, extensible parser according to the teachings of the illustrative embodiment significantly improves and facilitates modifications and changes to the parser rules driving the configuration of the storage network. Changes can be made quickly and easily without having to modify or recompile any programs running on the storage network. New templates can be loaded and replicated through the system affecting the operation of the network as a whole.

The described embodiment is merely illustrative and should not be considered restrictive in any way. Details of the parser configuration file and data storage network may vary substantially without departing from the spirit of the invention, and exclusive use of all modifications that come within the scope of the appended claims is reserved. It is intended that the invention be limited only to the extent required by the appended claims and the applicable rules of law. The scope of the invention is to be measured by the appended claims, rather than the preceding description, and all variations and equivalents that fall within the range of the claims are intended to be embraced therein.

What is claimed is:

1. A data storage system, comprising: a repository for holding configuration information for the data storage system; a parser for parsing said configuration information to provide parsed configuration information and;

a parser configuration file in communication with the parser defining rules for parsing said configuration information, wherein said parser configuration file is separate from said repository.

2. The data storage system of claim 1, wherein said parser configuration file is extensible, allowing a user to update said rules without affecting the operation of the data storage system.

3. The data storage system of claim 1, further comprising at least one host having an application, wherein the application utilizes said parsed configuration information to process data.

4. The data storage system of claim 3, further comprising a data storage device for remotely storing data from the at least one host.

5. The data storage system of claim 1, wherein the configuration information is divided into a shared configuration section and a persistent data section.

6. The data storage system of claim 1, wherein a key defined by the parser configuration file is utilized to retrieve data from the configuration repository.

7. The data storage system of claim 1, wherein a key defined by the parser configuration file is utilized to enter data into the configuration repository.

8. A method performed by a computational device, comprising:
   providing a parser for parsing configuration information from a configuration file;
   providing a parser configuration file;
   using the parser configuration file to establish rules for the parser to parse configuration information in a data storage system.

9. The method of claim 8, further comprising the step of parsing configuration information according to the rules established in the parser configuration file.

10. The method of claim 9, further comprising the step of using the parsed configuration information to run applications on a host in the data storage system.

11. The method of claim 8, wherein the parser configuration file defines a positional order of configuration information in a configuration repository.

12. The method of claim 8, wherein the parser configuration file defines for a first key a first set of data to access in a configuration repository.

13. The method of claim 12, wherein the step of parsing comprises entering the first key to access the first set of data.

14. A method of modifying actions performed by a parser of an electronic device in a data storage system, comprising:
   opening a parser configuration file defining rules for the parser to parse configuration information stored in a configuration repository of the data storage system;
   modifying the parser configuration file; and
   saving the modified parser configuration file.

15. The method of claim 14, wherein the parser configuration file defines a set of keys for entering or retrieving configuration information to be parsed.

16. The method of claim 15, wherein the step of modifying comprises the step of adding a new key to the set of keys for entering or retrieving configuration information.

17. The method of claim 16, wherein the step of adding a new key comprises defining the new key.

18. The method of claim 17, wherein the step of adding a new key further comprises defining a set of configuration information to which the new key corresponds.

19. The method of claim 14, wherein the step of saving the modified configuration file comprises:
   locking the modified configuration file; and
   writing the modified configuration file to a disk in the data storage system.

20. A method of providing configuration data to a device of a data storage system, comprising the steps of:
   storing raw configuration information for multiple components of the data storage system in a central repository;
   parsing the raw configuration information with a parser using rules established by a parser configuration file connected to a parser to produced parsed configuration information; and
   providing parsed configuration information to the device, wherein the device uses the parsed configuration information to rum an application stored on the device.

* * * * *